(12) United States Patent
Huang et al.

(10) Patent No.: US 9,535,591 B2
(45) Date of Patent: Jan. 3, 2017

(54) INFORMATION BROWSING ON AN ELECTRONIC DEVICE

(71) Applicant: INTERNATIONAL BUSINESS MACHINES CORPORATION, Armonk, NY (US)

(72) Inventors: Cheng Huang, Shanghai (CN); Yu Liu, Shanghai (CN); Yin Qian, Shanghai (CN); Yi Yan Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 14/220,629

(22) Filed: Mar. 20, 2014

(65) Prior Publication Data

US 2014/0289666 A1 Sep. 25, 2014

(30) Foreign Application Priority Data

Mar. 22, 2013 (CN) .......................... 2013 1 0095138

(51) Int. Cl.
*G06F 3/048* (2013.01)
*G06F 3/0485* (2013.01)
*G06F 3/0487* (2013.01)

(52) U.S. Cl.
CPC ......... *G06F 3/04855* (2013.01); *G06F 3/0485* (2013.01); *G06F 3/0487* (2013.01)

(58) Field of Classification Search
CPC ............................ G06F 3/048–3/04886; G06F 17/211–17/30126
See application file for complete search history.

(56) References Cited

U.S. PATENT DOCUMENTS

| | | | | |
|---|---|---|---|---|
| 8,621,390 | B1* | 12/2013 | Findley | G06F 15/0291 715/818 |
| 2005/0097453 | A1* | 5/2005 | Simonyi | G06F 8/10 715/234 |

(Continued)

FOREIGN PATENT DOCUMENTS

| | | |
|---|---|---|
| CN | 102934070 A | 2/2013 |
| EP | 1562105 A2 | 8/2005 |

(Continued)

OTHER PUBLICATIONS

Pulkit Jain, "Acrobat Made Simple," Mar. 13, 2012, available at URL http://blogs.adobe.com/acrobatmadesimple/page-thumbnails-pane-a-single-window-toolkit/ thumbnails-pane-a-single-window-toolkit/, accessed on Feb. 24, 2016.*

(Continued)

*Primary Examiner* — Claudia Dragoescu
(74) *Attorney, Agent, or Firm* — Law Office of Jim Boice

(57) ABSTRACT

A method, system and/or computer program product for information browsing comprises: obtaining screen partition information of an electronic device; obtaining a position of a user's current input on the screen; obtaining file segmentation information describing a mapping relationship between file segments and screen partitions; determining a file segment corresponding to the user's current input based on the screen partition information, the position of the user's current input on the screen, and the file segmentation information; and displaying a preview of the determined file segment that corresponds to the user's current input.

17 Claims, 3 Drawing Sheets

(56) References Cited

U.S. PATENT DOCUMENTS

| | | | | |
|---|---|---|---|---|
| 2012/0030623 A1* | 2/2012 | Hoellwarth | ......... | G06F 3/04817 |
| | | | | 715/811 |
| 2012/0131497 A1 | 5/2012 | Jitkoff | | |
| 2012/0249435 A1 | 10/2012 | Nahm | | |

FOREIGN PATENT DOCUMENTS

| | | |
|---|---|---|
| WO | 2010107661 A1 | 9/2010 |
| WO | 2012093446 A1 | 7/2012 |

OTHER PUBLICATIONS

S. Yang et al., "How Students Use Contextual Cues in Finding Information in Paper and Electronic Textbooks", Proceedings of the 2011 IEEE 11th International Conference on Advanced Learning Technologies, IEEE Computer Society, US, 2011, pp. 302-304.

D. Pai et al., "Method of Displaying Table of Contents and Progress Bar in an Interactive Digital Content", Adobe Systems, Inc., IP.com, IPCOM000206713D, May 3, 2011, pp. 1-6.

Anonymous, "Context-Aware Indexed Scroll Bars and Navigators", IP.com, IPCOM000219404D, June 27, 2012, pp. 1-7.

Jain, Pulkit. "Page Thumbnails Pane—A Single Window Toolkit", Acrobat Made Simple, Adobe Systems Incorporated, Mar. 13, 2012. <http://blogs.adobe.com/acrobatmadesimple/page-thumbnails-pane-a-single-window-toolkit/>.

Chinese Patent Application No. 201310095138.X Office Action Mailed Aug. 15, 2016.

* cited by examiner

INFORMATION BROWSING ON AN ELECTRONIC DEVICE

This application is based on and claims the benefit of priority from China (CN) Patent Application 201310095138.X, filed on Mar. 22, 2013, and herein incorporated by reference in its entirety.

BACKGROUND

The present invention relates to information processing, more particularly, to a method and system for information browsing.

As mobile electronic devices become popular, people increasingly use mobile electronic devices to browse information. Scrollbar is a manner of information browsing frequently used in prior art. However, due to the small size of screen of the mobile electronic devices, when there is a large amount of content (e.g., a 200 pages document), efficient content browsing can not be realized with a traditional scrollbar.

SUMMARY

A method, system and/or computer program product for information browsing comprises: obtaining screen partition information of an electronic device; obtaining a position of a user's current input on the screen; obtaining file segmentation information describing a mapping relationship between file segments and screen partitions; determining a file segment corresponding to the user's current input based on the screen partition information, the position of the user's current input on the screen, and the file segmentation information; and displaying a preview of the determined file segment that corresponds to the user's current input.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
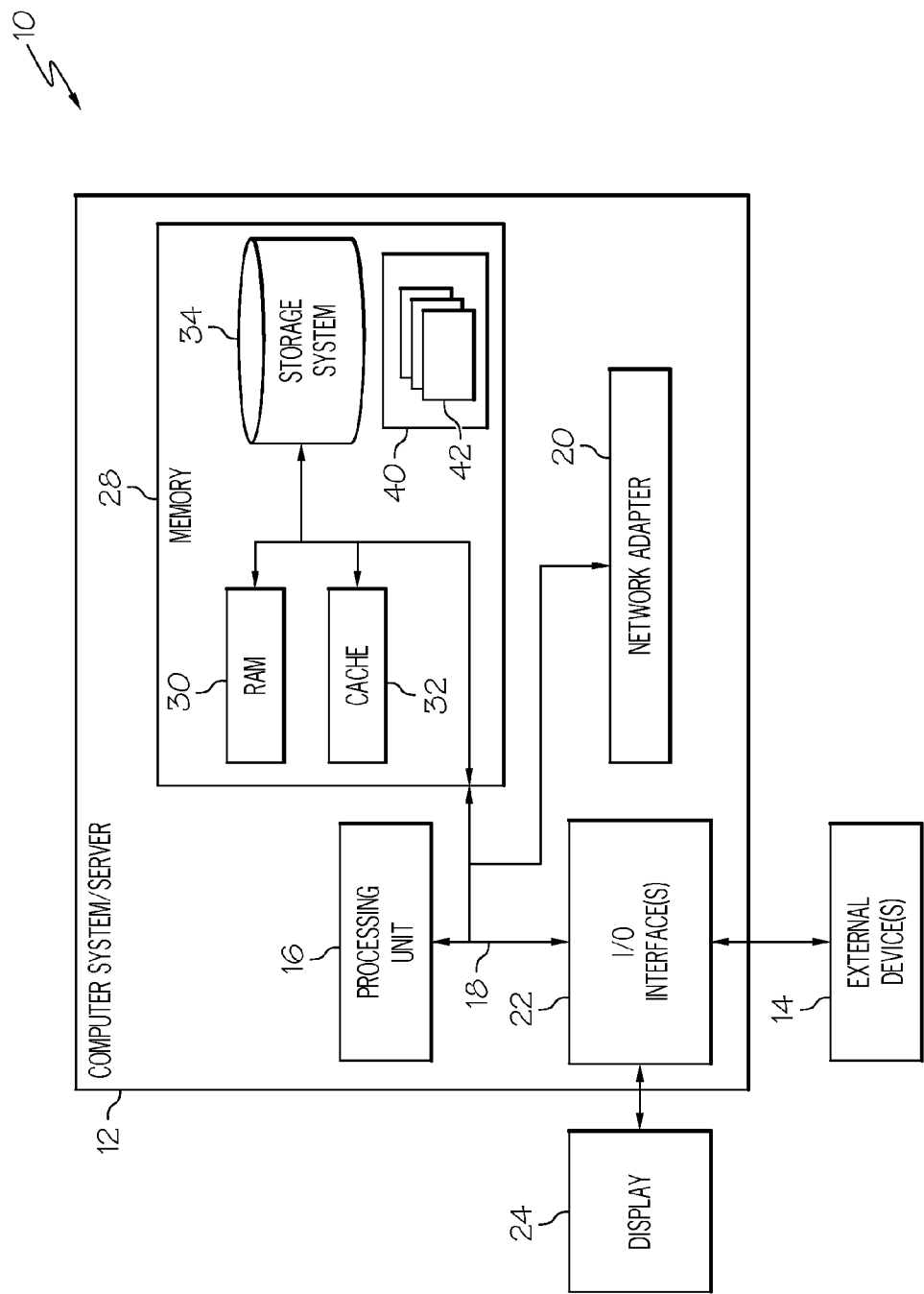
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

In addition to the traditional computer system/server 12 shown in FIG. 1, embodiments of the invention also comprise mobile electronic devices including, but not limited to, mobile phone, PDA, tablet etc. Typically, mobile electronic devices have input device including, but not limited to, touch-type input device such as touch screen, touch pad etc.

Figure 2:
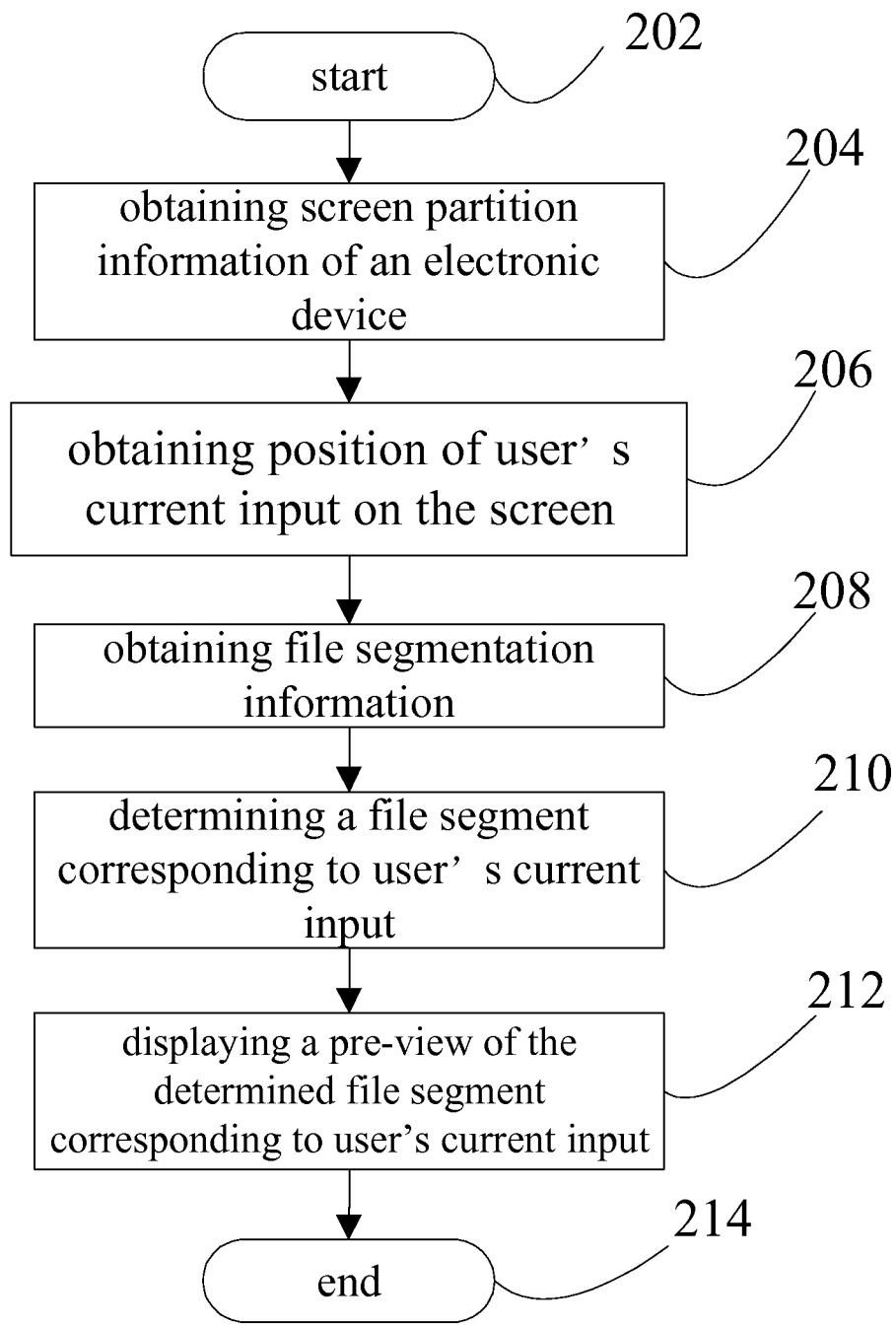
FIG. 2 shows a flowchart of a method 200 for information browsing according to an embodiment of the invention.

Now referring to FIG. 2, in which a flowchart of a method 200 for information browsing according to an embodiment of the invention is shown.

The method 200 for information browsing according to an embodiment of the invention begins at step 202. Next, the method 200 proceeds to step 204: obtaining screen partition information of an electronic device. The screen partition information describes information about how to divide screen of an electronic device, including screen position where each screen partition is located. For example, according to an embodiment of the invention, a screen may be evenly divided into four sections by a line segment that takes middle points of two edges in width direction as end points and a line segment that takes middle points of two edges in height direction as end points, thus forming four screen partitions, and each screen partition has a unique identifier (partition ID) to identify that partition. The screen partition information may be any possible data format, such as a data table. The table below illustratively gives an example of the screen partition information corresponding to the above described four evenly divided screen partitions when screen resolution of the electronic device is HVGA (320*480), wherein ID is unique identifier of a screen partition, coordinate 1, coordinate 2, coordinate 3 and coordinate 4 correspond to coordinate of four vertices of each screen partition, respectively.

| Screen | coordinate 1 | coordinate 2 | coordinate 3 | coordinate 4 |
|---|---|---|---|---|
| 1 | (0, 0) | (160, 0) | (0, 240) | (160, 240) |
| 2 | (161, 0) | (320, 0) | (161, 240) | (320, 240) |
| 3 | (0, 241) | (160, 241) | (0, 480) | (160, 480) |
| 4 | (161, 241) | (320, 241) | (161, 480) | (320, 480) |

It should be appreciated that, dividing screen of an electronic device into four evenly divided screen partitions, screen resolution being HVGA and the screen partition information shown in the above table are merely for purpose of illustration. According to other embodiments of the invention, screen of an electronic device may have various other possible screen resolutions, screen of an electronic device may be divided into more or less equal partitions, and screen partition information may take any other possible data structure. According to an embodiment of the invention, an electronic device has default screen partition information. Alternatively, partition of a screen may be designated by user, thereby storing corresponding screen partition information. According to an embodiment of the invention, each screen partition may be further sub-divided into two or more screen sub-partitions; accordingly, screen partition information may further comprise screen sub-partition information corresponding to each screen partition.

Next, the method 200 proceeds to step 206: obtaining position of user's current input on the screen. Obtaining position of user's current input on the screen may be realized by using any available methods in the prior art, for example, obtain capacitance or resistance value and variation thereof corresponding to user's current input based on nature of screen of the electronic device, thereby obtaining coordinate corresponding to user's current input.

Next, the method 200 proceeds to step 208: obtaining file segmentation information describing a mapping relationship between file segments and screen partitions. The file segmentation information may be computed and stored in advance based on screen partition information, or may be dynamically generated as an application is loaded. The file may be any user viewable file such as text, document, audio, video etc., and may be in any possible format. The file segment corresponds to division of the file, for example, for a text file, the file segment may be based on page or directory structure or any other possible form; for an audio or video file, the file segment may be based on time or chapter structure. Each file segment has a unique identifier. The file segmentation information may be in any possible data format, such as a data table. By still taking the above scenario for example, the table below gives the file segmentation information when the electronic device has four evenly divided screen partitions and the file is a 200 pages text file.

| File segment | Page range | Corresponding |
|---|---|---|
| 1 | 1-50 | 1 |
| 2 | 51-100 | 2 |
| 3 | 101-150 | 3 |
| 4 | 151-200 | 4 |

As shown above, according to an embodiment of the invention, the mapping relationship between file segments and screen partitions within the file segmentation information is fixed. According to another embodiment of the invention, the mapping relationship between file segments and screen partitions within the file segmentation information may also be dynamic, for example, may be a function of user input. According to an embodiment of the invention, each file segment may be further sub-divided into two or more file sub-segments, and accordingly, the file segmentation information may further comprise a mapping relationship between each file sub-segment and screen sub-partition.

Next, the method 200 proceeds to step 210: determining a file segment corresponding to user's current input based on the screen partition information, the position of user's current input on the screen and the file segmentation information. According to an embodiment of the invention, a screen partition corresponding to user's current input may be first determined based on the screen partition information and the position of user's current input on the screen, further, a file segment corresponding to user's current input is determined based on the file segmentation information. According to another embodiment of the invention, it may also be that, screen position of a screen partition corresponding to a file segment is first determined based on the screen partition information and the file segmentation information, further, the file segment corresponding to user's current input is determined based on position of user's current input on the screen. According to an embodiment of the invention, a file sub-segment corresponding to user's current input may also be determined based on the screen partition information, the position of user's current input on the screen and the file segmentation information. Of course, a file segment corresponding to user's current input may also be determined based on the screen partition information, the position of user's current input on the screen and the file segmentation information by using any other possible manners. For example, the screen partition information and the file segmentation information are first pre-processed, and then a file segment corresponding to user's current input is determined by using the pre-processed result and the position of user's current input on the screen.

Next, the method 200 proceeds to step 212: displaying a pre-view of the determined file segment corresponding to user's current input. The pre-view may be a pre-view corresponding to beginning position of the determined file segment, or may be a pre-view corresponding to an arbitrary position of the determined file segment. According to an embodiment of the invention, a pre-view of the determined file sub-segment corresponding to user's current input may also be further displayed.

Next, the method proceeds to step 214 where it ends.

According to one or more embodiments of the invention, screen of an electronic device can be fully utilized, thus efficient content browsing can be realized when there is a large amount of content.

According to an embodiment of the invention, position of user's current input on the screen may be obtained in response to detecting user's input.

According to another embodiment of the invention, position of user's current input on the screen may be obtained in response to detecting that user's input deviates from a linear scrollbar. Then, corresponding file position when user deviates from the linear scrollbar is obtained, and a file segment corresponding to user's current input is determined based on the screen partition information, the position of user's current input on the screen, the corresponding file position when user deviates from the linear scrollbar and the file segmentation information. The corresponding file position when user deviates from the linear scrollbar corresponds to the position when user deviates from the linear scrollbar, such as page number or chapter position for a text file, or time position for an audio or video file.

According to yet another embodiment of the invention, position of user's current input on the screen may be obtained in response to detecting that user's input enters into a new screen partition. Then, position of user's last input on the screen is obtained and a file segment corresponding to user's current input is determined based on the screen partition information, the position of user's last input on the screen, the position of user's current input on the screen and the file segmentation information.

According to an embodiment of the invention, the method 200 further comprising: obtaining hot spots in the determined file segment corresponding to user's current input, and displaying the hot spots, wherein the hot spots being evenly distributed within the screen partition corresponding to the position of user's current input on the screen.

Figure 3:
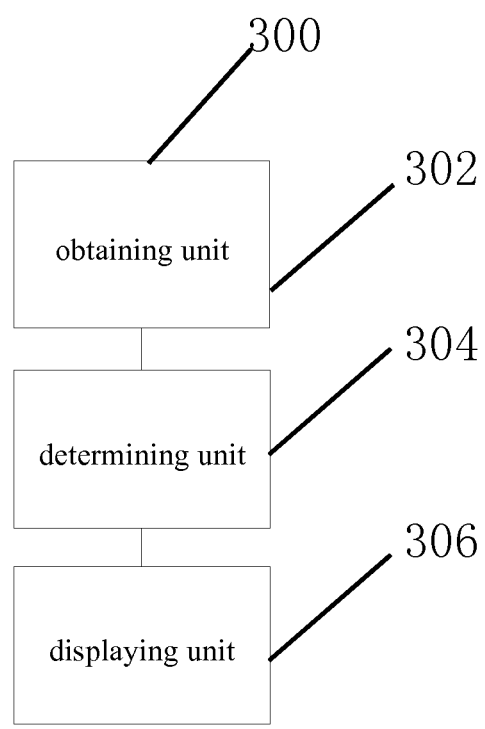
FIG. 3 shows a block diagram of a system 300 for information browsing according to an embodiment of the invention.

Now referring to FIG. 3, in which a block diagram of a system 300 for information browsing according to an embodiment of the invention is shown.

The system 300 for information browsing according to an embodiment of the invention comprising: an obtaining unit 302 configured to: obtain screen partition information of an electronic device; obtain position of user's current input on the screen; obtain file segmentation information describing a mapping relationship between file segments and screen partitions; a determining unit 304 configured to: determine a file segment corresponding to user's current input based on the screen partition information, the position of user's current input on the screen and the file segmentation information; and a displaying unit 306 configured to: display a pre-view of the determined file segment corresponding to user's current input.

According to an embodiment of the invention, the obtaining unit 302 is further configured to obtain position of user's current input on the screen in response to detecting user's input.

According to an embodiment of the invention, the obtaining unit 302 is further configured to obtain position of user's current input on the screen in response to detecting that user's input deviates from a linear scrollbar, and obtain corresponding file position when user deviates from the linear scrollbar. The determining unit 304 is further configured to determine a file segment corresponding to user's current input based on the screen partition information, the position of user's current input on the screen, the corresponding file position when user deviates from the linear scrollbar and the file segmentation information. The corresponding file position when user deviates from the linear scrollbar refers to information of position in the file at which user deviates from the linear scrollbar, such as page information for a text file, or time information for an audio or video file.

According to an embodiment of the invention, the obtaining unit 302 is further configured to obtain position of user's current input on the screen in response to detecting that user's input enters into a new screen partition, and obtain position of user's last input on the screen. The determining unit 304 is further configured to determine a file segment corresponding to user's current input based on the screen partition information, the position of user's last input on the screen, the position of user's current input on the screen and the file segmentation information.

According to an embodiment of the invention, the obtaining unit 302 is further configured to obtain hot spots in the determined file segment corresponding to user's current input. The displaying unit 306 is further configured to display the hot spots, wherein the hot spots being evenly distributed within the screen partition corresponding to the position of user's current input on the screen.

As described herein, illustrative embodiments of the invention provide a method and system for information browsing, which are capable of realizing efficient content browsing when there is a large amount of content.

According to one aspect of the present invention, there is provided a method for information browsing, comprising: obtaining screen partition information of an electronic device; obtaining position of user's current input on the screen; obtaining file segmentation information describing a mapping relationship between file segments and screen partitions; determining a file segment corresponding to user's current input based on the screen partition information, the position of user's current input on the screen and the file segmentation information; and displaying a pre-view of the determined file segment corresponding to user's current input.

According to another aspect of the present invention, the method for information browsing further comprising: obtaining hot spots in the determined file segment corresponding to user's current input; displaying the hot spots, wherein the hot spots being evenly distributed within the screen partition corresponding to the position of user's current input on the screen.

According to one aspect of the present invention, there is provided a system for information browsing, comprising: an obtaining unit configured to: obtain screen partition information of an electronic device; obtain position of user's current input on the screen; obtain file segmentation information describing a mapping relationship between file segments and screen partitions; a determining unit configured to: determine a file segment corresponding to user's current input based on the screen partition information, the position of user's current input on the screen and the file segmentation information; and a displaying unit configured to: display a pre-view of the determined file segment corresponding to user's current input.

According to another aspect of the present invention, the obtaining unit is further configured to obtain hot spots in the determined file segment corresponding to user's current input; the displaying unit is further configured to display the hot spots, wherein the hot spots being evenly distributed within the screen partition corresponding to the position of user's current input on the screen.

According to another aspect of the present invention, there is also provided a computer program product for information browsing.

With one or more embodiments of the present invention, efficient content browsing can be realized when there is a large amount of content.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for information browsing, the method comprising:
    obtaining, by one or more processors, screen partition information of an electronic device, wherein the screen partition information describes a partitioning of a display on the electronic device into multiple coordinate sections;
    obtaining, by one or more processors, a position of a user's current input on a screen of the electronic device, wherein the user's current input is provided by a user to indicate the user choosing a particular screen partition on the display;
    obtaining, by one or more processors, file segmentation information describing a mapping relationship between file segments and screen partitions;
    determining, by one or more processors, a file segment corresponding to the user's current input based on the screen partition information, the position of the user's current input on the screen, and the file segmentation information, wherein said determining the file segment corresponding to the user's input is performed in response to detecting that the user's current input is entered into a new screen partition; and
    displaying, by one or more processors, a preview of a determined file segment corresponding to the user's current input.

2. The method according to claim 1, wherein said obtaining the position of the user's current input on the screen is performed in response to detecting user's input.

3. The method according to claim 1, further comprising:
    detecting, by one or more processors, that the user is using a linear scrollbar on the display by positioning a cursor over the linear scrollbar on the display;
    detecting, by one or more processors, that the user has moved the cursor away from the linear scrollbar; and
    in response to detecting that the user has moved the cursor away from the linear scrollbar, obtaining, by one or more processors, the position of the user's current input on the screen.

4. The method according to claim 3, further comprising:
    obtaining, by one or more processors, a corresponding file position in response to the user deviating from the linear scrollbar; and
    determining, by one or more processors, a file segment that corresponds to the user's current input based on the screen partition information, the position of the user's current input on the screen, the corresponding file position that results from the user deviating from the linear scrollbar, and the file segmentation information.

5. The method according to claim 1, further comprising:
    obtaining, by one or more processors, a position of a user's last input on the screen; and
    determining, by one or more processors, a file segment corresponding to the user's current input based on the screen partition information, the position of the user's last input on the screen, the position of the user's current input on the screen, and the file segmentation information.

6. The method according to claim 1, further comprising:
    obtaining, by one or more processors, hot spots in the determined file segment corresponding to the user's current input; and
    displaying, by one or more processors, the hot spots, wherein the hot spots are evenly distributed within the screen partition corresponding to the position of the user's current input on the screen.

7. A computer program product for information browsing, the computer program product comprising a non-transitory computer readable storage medium having program code embodied therewith, the program code readable and executable by a processor to perform a method comprising:
    obtaining screen partition information of an electronic device, wherein the screen partition information describes a partitioning of a display on the electronic device into multiple coordinate sections;
    obtaining a position of a user's current input on a screen of the electronic device, wherein the user's current input is provided by a user to indicate the user choosing a particular screen partition on the display;
    obtaining file segmentation information describing a mapping relationship between file segments and screen partitions;
    determining a file segment corresponding to the user's current input based on the screen partition information, the position of the user's current input on the screen, and the file segmentation information, wherein said determining the file segment corresponding to the user's input is performed in response to detecting that the user's current input is entered into a new screen partition; and
    displaying a preview of a determined file segment corresponding to the user's current input.

8. The computer program product according to claim 7, wherein said obtaining the position of the user's current input on the screen is performed in response to detecting a user's input.

9. The computer program product according to claim 7, wherein said obtaining the position of the user's current input on the screen is performed in response to detecting that a user's input deviates from a linear scrollbar.

10. The computer program product according to claim 9, wherein the method further comprises:
   obtaining a corresponding file position in response to the user deviating from the linear scrollbar; and
   determining a file segment that corresponds to the user's current input based on the screen partition information, the position of the user's current input on the screen, the corresponding file position that results from the user deviating from the linear scrollbar, and the file segmentation information.

11. The computer program product according to claim 7, wherein the method further comprises:
   obtaining position of a user's last input on the screen; and
   determining a file segment corresponding to the user's current input based on the screen partition information, the position of the user's last input on the screen, the position of the user's current input on the screen, and the file segmentation information.

12. The computer program product according to claim 7, wherein the method further comprises:
   obtaining hot spots in the determined file segment corresponding to the user's current input; and
   displaying the hot spots, wherein the hot spots are evenly distributed within the screen partition corresponding to the position of the user's current input on the screen.

13. A system comprising:
   a processor, a computer readable memory, and a computer readable storage medium;
   first program instructions to obtain screen partition information of an electronic device, wherein the screen partition information describes a partitioning of a display on the electronic device into multiple coordinate sections;
   second program instructions to obtain a position of a user's current input on a screen of the electronic device, wherein the user's current input is provided by a user to indicate the user choosing a particular screen partition on the display;
   third program instructions to obtain file segmentation information describing a mapping relationship between file segments and screen partitions;
   fourth program instructions to determine a file segment corresponding to the user's current input based on the screen partition information, the position of the user's current input on the screen, and the file segmentation information, wherein the file segment corresponding to the user's input is determined in response to detecting that the user's current input is entered into a new screen partition; and
   fifth program instructions to display a preview of a determined file segment corresponding to the user's current input; and wherein
   the first, second, third, fourth, and fifth program instructions are stored on the computer readable storage medium, and wherein the first, second, third, fourth, and fifth program instructions are executed by the processor via the computer readable memory.

14. The system according to claim 13, wherein said obtaining the position of the user's current input on the screen is performed in response to detecting a user's input.

15. The system according to claim 13, wherein said obtaining the position of the user's current input on the screen is performed in response to detecting that a user's input deviates from a linear scrollbar.

16. The system according to claim 15, further comprising:
   sixth program instructions to obtain a corresponding file position in response to the user deviating from the linear scrollbar; and
   seventh program instructions to determine a file segment that corresponds to the user's current input based on the screen partition information, the position of the user's current input on the screen, the corresponding file position that results from the user deviating from the linear scrollbar, and the file segmentation information; and wherein
   the sixth and seventh program instructions are stored on the computer readable storage medium, and wherein the sixth and seventh program instructions are executed by the processor via the computer readable memory.

17. The system according to claim 13, further comprising:
   sixth program instructions to obtain hot spots in the determined file segment corresponding to the user's current input; and
   seventh program instructions to display the hot spots, wherein the hot spots are evenly distributed within the screen partition corresponding to the position of the user's current input on the screen; and wherein
   the sixth and seventh program instructions are stored on the computer readable storage medium, and wherein the sixth and seventh program instructions are executed by the processor via the computer readable memory.

* * * * *